United States Patent
Barkol et al.

(10) Patent No.: US 8,620,092 B2
(45) Date of Patent: Dec. 31, 2013

(54) DETERMINING SIMILARITY OF TWO IMAGES

(75) Inventors: Omer Barkol, Haifa (IL); Hadas Kogan, Zichron Yaacov (IL); Doron Shaked, Tivon (IL); Mani Fischer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 381 days.

(21) Appl. No.: 12/717,659

(22) Filed: Mar. 4, 2010

(65) Prior Publication Data

US 2011/0216979 A1 Sep. 8, 2011

(51) Int. Cl.
*G06K 9/68* (2006.01)

(52) U.S. Cl.
USPC ........... 382/218; 382/264; 382/274; 382/275; 358/3.27; 358/463

(58) Field of Classification Search
CPC .............................................. G06F 17/30244
USPC .......... 382/218, 264, 274, 275; 358/3.27, 463
See application file for complete search history.

(56) References Cited

U.S. PATENT DOCUMENTS 7,551,794 B2 * 6/2009 Masuno et al. ................ 382/264
2008/0008369 A1 * 1/2008 Koptenko et al. ............. 382/128

OTHER PUBLICATIONS

Wang, Z. et al., "Image quality assessment: From error visibility to structural similarity", IEEE Trans. on Image Processing, vol. 13, No. 4, pp. 600-612, 2004.
Wang, Z. et al., "Translation insensitive image similarity in complex wavelet domain", ICASSP, vol. 2, pp. 573-576, 2005.
Wang, Z. et al., "Multi-scale structural similarity for image quality assessment", Proceedings IEEE Conference on Signals, Systems, and Computers, pp. 1398-1402, 2003.
Wu, H.R. et al., "Digital Video Image Quality and Perceptual Coding (Signal Processing and Communications)", CRC Press, Inc., pp. 1-55, 2005.
Piella, G. et al., "A new quality metric for image fusion,", IEEE, pp. 173-176, 2003.

* cited by examiner

*Primary Examiner* — Mike Rahmjoo

(57) ABSTRACT

A computer implemented method is disclosed. The method includes obtaining a first and second images for comparison, globally registering the first and second images, calculating for pairs of a first patch of the first image and second patch of the second image a similarity measure which is a product of luminance and contrast components and a normalized structure component, each component taking a value between 0 and 1 and determining similarity of the images based on the calculated similarity measure. Relating computer program product and data processing system are also disclosed.

20 Claims, 5 Drawing Sheets

SSIM - 0.92887, new SSIM - 0.9648
CWSSIM - 0.91897, SPSSIM - 1

SSIM - 0.99719, new SSIM - 0.99794
CWSSIM - 0.99039, SPSSIM - 0.99867

SSIM - 0.96835, new SSIM - 0.97441
CWSSIM - 0.94074, SPSSIM - 0.98229

DETERMINING SIMILARITY OF TWO IMAGES

FIELD OF THE INVENTION

The present invention relates to determining similarity of two images.

BACKGROUND

It is sometimes desired to compare two images that are supposed to be practically identical (e.g. identical to the human eye) to determine whether indeed they are so. This may be desired, for example, when considering two prints of the same image, a printed image (compared to its digital image file), two different representations of the same image, and various other pairs of supposedly identical images.

The causes for differences in supposedly identical images are various and may include, for example, encountering printing defects, using of different compression methods and improper alignment (misregistration).

Defects in printed images can be caused, for example, by anomalies in print medium, interactions between print medium and marking material, systematic defects introduced by print mechanisms or human error. Image defects may include, for example, scratches, spots, missing dot clusters, streaks, and banding.

One specific defect is misregistration, which occurs when the two copies of the same image are shifted with respect to one another by as much as one or more pixels, yet the same image appears in both copies. While misregistration by a plurality of pixels may be spotted by the human eye, misregistration by a single or a few pixels is very hard to detect and sub-pixel registration (a shift of a duplicate image by less than a pixel with respect to the reference image) is practically impossible to spot by human inspection. Furthermore, in many instances it would not desired to tag a pair of slightly shifted images as "different".

A few years ago a new image quality assessment approach was introduced, named SSIM (Structural SIMilarity) index or measure, in which a quantitative approach was used to quantify visibility of errors (differences) between a distorted image and a reference image, based on the degradation of structural information.

SSIM successfully recognizes matching structural features in misregistered images, preventing tagging of these images as different, when misregistration consists of one or more pixels.

However, in some instances sub-pixel misregistration may be involved. This is caused when two identical images differ in their alignment by a fraction of a pixel. As a single pixel may only take one grey level value. Consider, for example, a case in which an original image presents an edge formed of adjacent bordering pixels, e.g. a row of adjacent pixels whose values are: 0,0,1,1. If a duplicate image is shifted with respect to the original image by less than one pixel (e.g. by half a pixel to the left) than the pixel values of the corresponding pixel row of the duplicate image would be: 0.0.5,1,1—the pixel with the value of 0.5 being an average value of 0 and 1.

Applying SSIM would result in determining that there is a difference between the original and duplicate images, where in fact, the two images would not be regarded as be different when inspected by a human eye.

BRIEF DESCRIPTION OF THE DRAWINGS

Reference is made to the accompanying drawings, in which.

DETAILED DESCRIPTION

Figure 1:
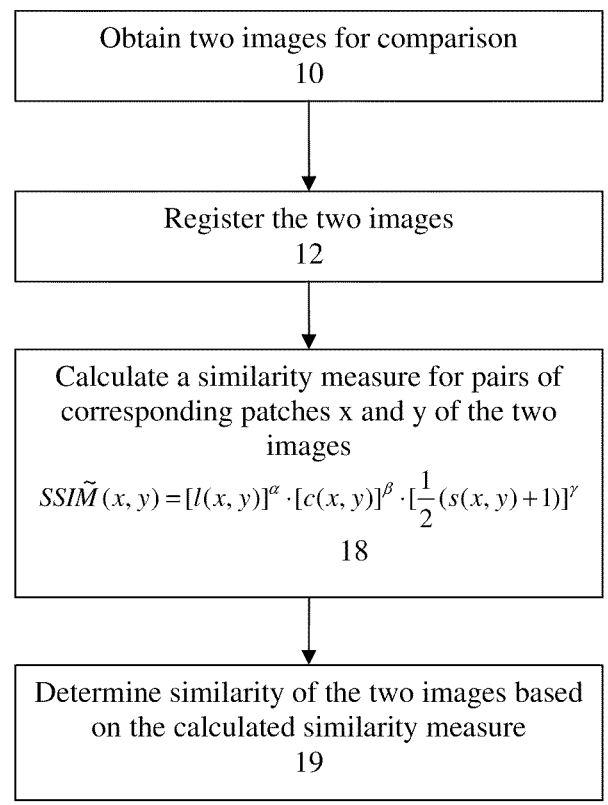
FIG. 1 illustrates a method for determining similarity of two images, according to embodiments of the present invention.

A proposed method according to embodiments of the present invention relies on the structural-similarity based image quality assessment (SSIM), as it is an image measure that is believed to reflect the human perception. SSIM has received a great amount of attention and was used in many different applications, such as video quality assessments, medical image quality analysis and other applications. In the SSIM assessment technique two image patches that appear similar to the human eye are assigned with a high similarity score and two patches that appear different with a low similarity score. SSIM locally compares between corresponding patches of the two registered images.

Each patch receives a score that represents its similarity to the reference patch. Finally, an overall similarity is computed by averaging the similarities of the different patches. Due to its local nature SSIM is used to locate corresponding patches with differences. However, in the presence of misregistration the SSIM grade of two corresponding patches degrades, and a false alarm may result. To overcome false alarm in the case of misregistration in full pixels, each patch of one image may be compared to patches in a small search window of the second image in a greater area in which the corresponding patch is located, and is assigned with the maximal SSIM grade. However, this does not prevent a false alarm in the case of sub-pixel misregistration.

Several variants of SSIM were introduced. For example, CWSSIM (Complex Wavelt SSIM) that compares two images in the wavelets domain, and is less sensitive to small spatial differences. However, it produces only one similarity grade and not a similarity map as would the standard SSIM. Thus, local differences between two almost similar images (for instance, two similar images where one of them contains small difference area) might not affect the overall grade.

It is asserted that an image Similarity Measure $SM \leq 1$ with $SM(x,y)=1$ if and only if (iff) $x=y$ respects linear combinations if for any two image patches x and y, and for any a∈[0,1], SM (x, y)≤SM (x,ax+(1−a)y). In other words, a linear combination of two patches x and y is more similar to x (or y) than y is to x.

In SSIM a patch x might be considered more similar to a patch y than to a linear combination of x and y, z=ax+(1−a)y, a∈[0,1].

According to embodiments of the present invention SSIM may be slightly modified preserving all its previous properties, while fixing this inconsistency, to avoid declaring patch x more similar to a patch y than to a linear combination thereof.

According to embodiments of the present invention a few different aspects of image similarity measures are addressed:

1. It is asserted that a similarity metric should "respects linear combinations". Although the original SSIM does not hold this property, a modification to SSIM according to embodiments of the present invention, does hold it, while maintaining the desired properties of SSIM. One of the variants of SSIM that has been proposed in the past is Multi-Scale SSIM. A multi-scale variation can be applied to the modified SSIM measure according to embodiments of the present invention. For sake of simplicity single scale is considered throughout this specification, yet is it asserted that the present invention is readily applicable to multi-scale too.

2. A new image metric is introduced that is insensitive to sub-pixel misregistration, that uses as a building block the proposed modified SSIM (hereinafter also referred to as—SSIM̃), according to embodiments of the present invention.

SSIM as defined (prior art) considers two images X and Y. For each pair of square image patches x of X and y of Y the SSIM score is calculated by:

$$SSIM(x, y) = [l(x, y)]^\alpha \cdot [c(x, y)]^\beta \cdot [S(x, y)]^\gamma = \quad (1)$$

$$= \left(\frac{2\mu_x\mu_y + C_1}{\mu_x^2 + \mu_y^2 + C_1}\right)^\alpha \cdot \left(\frac{2\sigma_x\sigma_y + C_2}{\sigma_x^2 + \sigma_y^2 + C_2}\right)^\beta \cdot \left(\frac{\sigma_{xy} + C_3}{\sigma_x\sigma_y + C_3}\right)^\gamma$$

where l, c and s are the luminance, contrast and structure components, respectively, which in turn are computed using $\mu_x$, $\sigma_x$ and $\sigma_{xy}$ the (weighted) mean, standard deviation, and covariance functions, respectively, and where $\alpha$, $\beta$ and $\gamma$ are parameters used to adjust the relative importance of the three components, $\alpha>0$, $\beta>0$, $\gamma>0$. $C_1$, $C_2$ and $C_3$ are constants. For brevity we choose $\alpha$, $\beta$ and $\gamma$ to have, each, the value of 1, and $C_1$, $C_2$ and $C_3$ to be, each, zero.

Note that SSIM(x, y)≤1 and SSIM(x, y)=1 when x=y.

Note also that while the values of $[l(x, y)]^\alpha$ and $[c(x, y)]^\beta$ may vary between 0 and 1, $[s(x, y)]^\gamma$ may take a value between −1 and 1, thus the SSIM score might be negative. Thus, unintuitively, low scores in the luminance and contrast components with negative score in the structure component will obtain a better score (small negative number) than in the case where the luminance and contrast components obtain, each, a perfect score of 1. In particular, a patch which is a linear combination of two patches, might be considered "more different" to one of the patches than the two patches would be with respect to each other.

The following property is defined, and it is asserted that a general similarity measure should intuitively possess this property:

As mentioned hereinabove, an image similarity measure SM≤1 with SM(x,y)=1 if and only if (iff) x=y respects linear combinations if for any two image patches x and y, and for any a∈[0,1], SM (x, y)≤SM (x,ax+(1−a)y).

In order to meet this criterion a new similarity measure is introduced, according to embodiments of the present invention:

$$SSI\tilde{M}(x, y) = [l(x, y)]^\alpha \cdot [c(x, y)]^\beta \cdot \left[\frac{1}{2}(s(x, y) + 1)\right]^\gamma \quad (2)$$

The modification consists of normalizing the structure component of the original SSIM measure to obtain a value between 0 and 1 instead of between −1 and 1, thus preventing the modified SSIM from returning negative values. In terms of comparing the structural features of the compared patches this means that a linear combination of patches will not be labeled as "more different" to one of the patches than the would either of these patches be "different" with respect to each other.

It is asserted that the new modified similarity measure SSIM̃ holds the following properties:
1. SSIM̃(x, y)=SSIM̃(y, x)
2. SSIM̃(x, y)∈[0,1]
3. SSIM̃(x, y)=1 iff x=y
4. SSIM̃ respects linear combinations.

After SSIM̃ is calculated for pairs of corresponding patches of the two images, the overall similarity between the two images may be determined based on the similarity measure calculated for all pairs of corresponding patches. This may be achieved, for example, by calculating an average for all similarity measures or by producing a similarity map to determine the overall similarity between the two images.

According to embodiments of the present invention if it is desired to ignore sub-pixel misregistration (that is: avoid declaring two images which are misregistered by a sub-pixel distance as "different" images) the following steps may be taken:

Assume a setting of two similar images, subjected to sub-pixel misregistration. A patch y, which is similar to x but misregistered by a fraction of a pixel (sub-pixel misregistration), can be approximated by a linear combination of x and $\tilde{x}$, where $\tilde{x}$ is a shift by one pixel of x (for brevity only a one dimensional shift is considered herein, but it is understood that this applies to two dimensional misintegration too). Now, consider y that is similar to x up to some unknown sub-pixel misregistration. If SM (Similarity Measure) respects linear combinations it holds that SM (x,$\tilde{x}$)≤SM (x, y). One of the benefits in presenting a similarity measure that respects linear combinations is to overcome sub-pixel misregistration.

For any similarity measure SM that is based on local structural comparison, and for $G_{SM}$=SM (x,$\tilde{x}$) a modification of SM is defined to be:

$$SM_{sp}(x, y) = \min\left(1, \frac{SM(x, y)}{G_{SM}(x)}\right) \quad (3)$$

Note, in the case of a similarity measure that respects linear combinations, that if the difference between x and y is only their subpixel misregistration, $SM_{sp}(x, y)=1$, as in the case of $G_{SM}(x)\leq SM(x, y)$.

In short, the modified measure SSIM̃ (2) may be used, according to embodiments of the present invention as a base similarity measure and then (3) is applied to overcome differences attributed to sub-pixel misregistration to obtain SSIM̃$_{sp}$ (also denoted SPSSIM).

In practice, sub-pixel misregistration may be present in both axes, i.e., a patch might be a linear combination of 4 patches rather than only 2. In such a two dimensional case, SPSSIM is generalized as follows:

Let $N_x$ be a set of 8 patches in the 8-pixel neighborhood of a pixel in patch x (analogous to the geographical direction N (North), NE (North East), E (East), SE (South East), S (South), SW (South West), W (West), NW (North West)). Then, SPSSIM is used modifying the function $G_{SM}(x)$, such that, $$G_{SM}(x) = \min_{\tilde{x} \in N_x} [\delta \cdot SM(x, \tilde{x}) + \varepsilon]$$

where $\delta$ and $\in$ are constants that control the tradeoff between the numbers of false alarms and mis-detection, and are chosen empirically. If a prior knowledge exists on the likelihood of specific misregistration different number of neighboring pixels may be taken into the account (e.g. if it is known that subpixel misregistration is possible only in horizontal and vertical directions one can take into account only 4-neighboring pixels (e.g. N, E, S, W).

Thus in general, for any SM, a modified $SM_{sp}$, which takes into account sub-pixel misregistration (i.e. ignores sub-pixel misregistration), is given by:

$$SM_{sp}(x, y) = \min\left(1, \frac{SM(x, y)}{G_{SM}(x)}\right) \quad (4)$$

Where $$G_{SM}(x) = \min_{\tilde{x} \in N_x} [\delta \cdot SM(x, \tilde{x}) + \varepsilon],$$

$N_x$ being a set of n patches in the n-pixel neighborhood of a pixel in patch x.

Reference is now made to the accompanying figures.

FIG. 1 illustrates a method for comparing two images, according to embodiments of the present invention.

According to embodiments of the present invention a method for comparing two images to determine similarity may include the following steps:

Two images for comparison are obtained 10 in digital format. The two images may be, for example, two raster images, one of which is a reference image and another which is a scanned print made from the reference image.

The two images are then globally registered 12. Registration of the two images can be achieved using any suitable registration method as is known in the art, and it will be appreciated by the skilled person that the scope of the present invention is not restricted to a specific registration method. It is asserted that the registered images may posses some local mis-registrations.

Then, a similarity measure SSIM̃ is calculated for aligned pairs of patches of the two images (a patch of each image) 18.

The calculated similarity measure is a product of luminance, contrast and structure components, in which all components, including the structure component, may take a value between 0 and 1 (as described hereinabove). As a result, the returned calculated has also a value between 0 and 1. The closer the returned calculated value to 1 the greater the similarity between the two patches, and if the returned calculated value is 1, the two patches are determined to be identical.

Finally, the overall similarity between the two images is determined 19, based on the similarity measure calculated for all pairs of corresponding patches, for example, by calculating an average for all similarity measures or by producing a similarity map to determine the overall similarity between the two images, for example by analyzing this map using standard image processing methods such as thresholding, and searching for large components or components with certain structure, such as lines.

Figure 2:
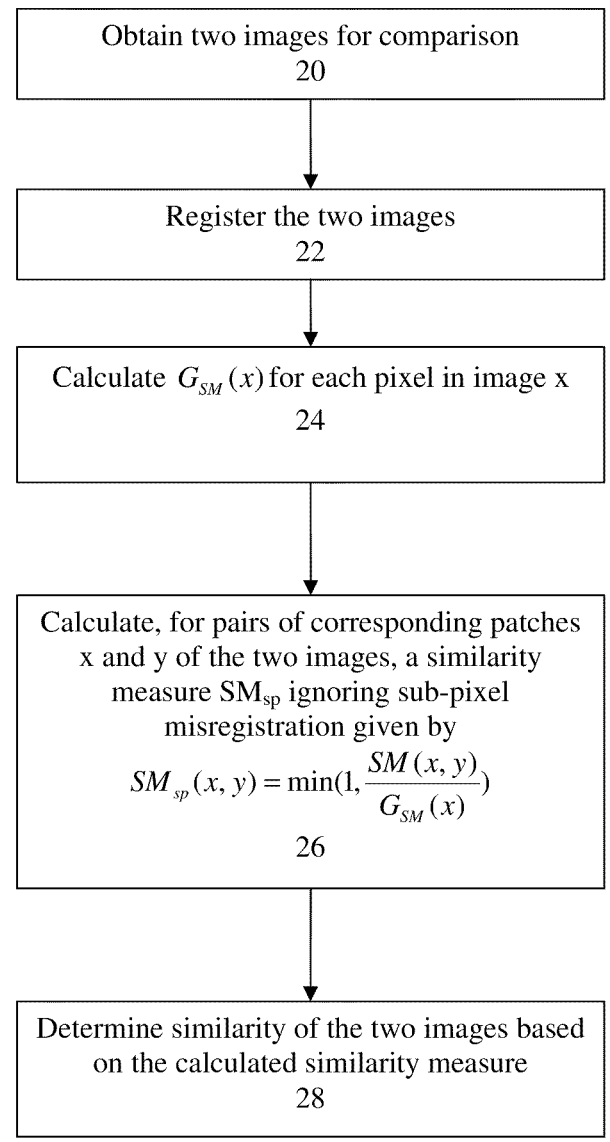
FIG. 2 illustrates a method for determining similarity of two images, while ignoring differences attributed to sub-pixel misregistration, according to embodiments of the present invention.

FIG. 2 illustrates a method for determining similarity of two images, while ignoring differences attributed to sub-pixel misregistration, according to embodiments of the present invention.

Two images to be compared are obtained 20. The two images (x, y) are globally registered 22. Again it is assumed that some local misregistration may occur.

$G_{SM}(x)$ is calculated for each pixel in image x 24, and then a similarity measure $SM_{sp}$ is calculated 26 for aligned pairs of patches x and y ignoring sub-pixel misregistration given by $$SM_{sp}(x, y) = \min\left(1, \frac{SM(x, y)}{G_{SM}(x)}\right),$$

where $$G_{SM}(x) = \min_{\tilde{x} \in N_x} [\delta \cdot SM(x, \tilde{x}) + \varepsilon],$$

$N_x$ being a set of n patches in the n-pixel neighborhood of a pixel in patch x.

Finally the similarity of the two images is determined based on the calculated similarity measure 28. Again, the determination of similarity between the two images may be based on the similarity measure calculated for all pairs of corresponding patches, such as, for example, by calculating an average for all similarity measures or by producing a similarity map to determine the overall similarity between the two images. The similarity map may be analyzed, for example by using standard image processing methods such as thresholding, and searching for large components or components with certain structure, such as lines Note that the abovementioned method (FIG. 2 and corresponding description) is directed at ignoring sub-pixel misregistration while determining similarity of two images and in fact any similarity measure which is based on local structural comparison may be used as similarity measure SM(x, y). for many purposes it would be useful to employ similarity measure SM(x, y) which respects linear combinations, such as, for example, SSIM̃.

A method for comparing two images to determine similarity, according to embodiments of the present invention, may be useful, for example, in comparing two digital images which were saved using two different compression methods.

A method for comparing two images to determine similarity, according to embodiments of the present invention, may also be useful, for example, in comparing two scanned prints of the same image.

Figure 3:
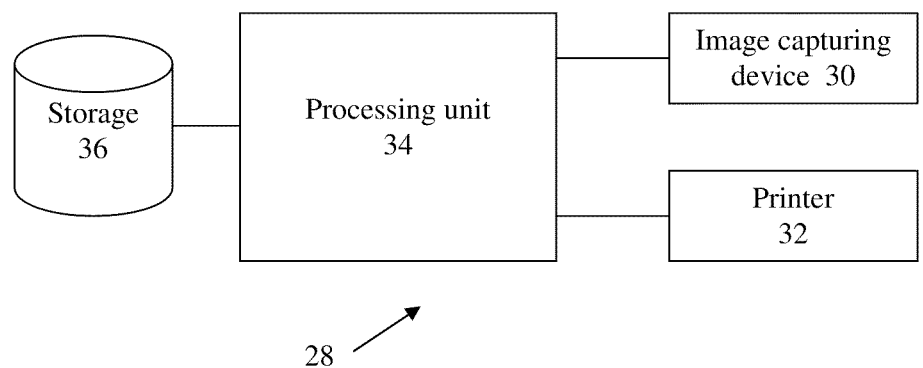
FIG. 3 illustrates a system for printing images and for comparing two images, according to embodiments of the present invention.

FIG. 3 illustrates a system for printing images and for comparing two images, according to embodiments of the present invention.

The system, generally denoted by numeral 38, includes a processing unit 34 in communication with storage 36, printer 32 and image capturing device 30.

System 38 may be, for example, a print system for printing an image from image data and detecting image defects in the resulting printed image. System 38 may include a print assembly (denoted printer 32) which may include, for example, a writing head, a photo imaging plate, a blanket drum and an impression drum. The print assembly may correspond to that of an offset lithographic printer and/or liquid electro-photographic (LEP) printer such as the HP Indigo Digital Press®. However, any suitable mechanism for printing an image from image data may be used without departing from the scope of the present invention, such as laser printers, inkjet printers, dye-sublimation printers etc. The writing head may include a laser device or other light source suitable for writing an image on an electro-photographic surface. Also included in system 38 may be an image capturing device 30 or any other image capture arrangement, a processing unit 34 and/or an image processor.

In the present embodiment, image capturing device 30 may be a device capable of converting an image on a print medium or product to a digital image. Image capturing device 30 may be an in-line camera and/or an in-line scanner. It may be arranged within printer 32 so as to capture an image of a printed medium moving with respect to the in-line image capturing device 30. The image capturing device 30 may be arranged to capture an image of the printed medium at the same or at a lower resolution than the print resolution. The image capturing device 30 may be arranged to capture a part of the printed image and/or the entire printed image. The image capturing device 30 may include one or a plurality of image capture sensors such as photosensors, LEDs, laser diodes, scanners, etc. For example, multiple scanners may be arranged next to each other, each scanner having a width that may be less than the maximum medium width, wherein the scanning areas of the scanners may overlap. The image capturing device 30 may be arranged to capture image on one or two sides of the printed medium, e.g. for two sided printing. For example, scanners may be arranged on opposite sides so that the printed medium passes between the two opposite scanners and is scanned on both printed sides. Each sensor may be arranged to capture a part of the image printed onto the printed medium, and/or the entire width of the printed medium. The sensor may include a single color channel (i.e. monochrome) or a multiple color channels sensor, for example, to capture a gray level and/or RGB target image, respectively.

Storage 36, which may be any computer usable medium, may store one or more computer programs which are to be executed by the processing unit, including a computer program implementing a method for determining similarity of two images, according to embodiments of the present invention.

Figure 4A:
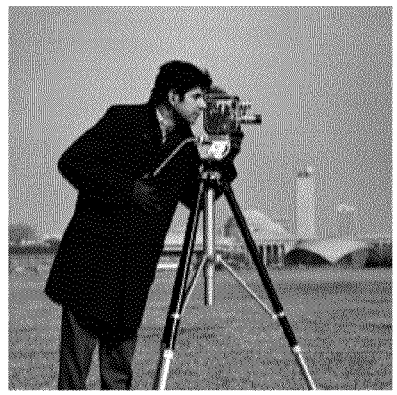
FIG. 4A presents a cameraman image with a sub-pixel misregistration (0.5 pixel to the right) with respect to a reference image.
Figure 4B:
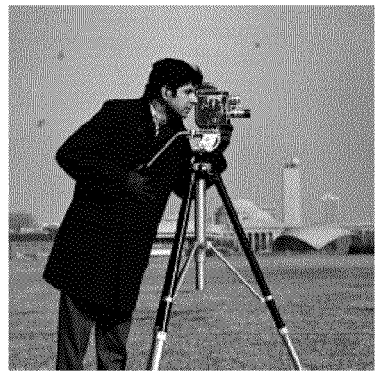
FIG. 4B presents the cameraman image with three small significant differences (small visible spots).
Figure 4C:
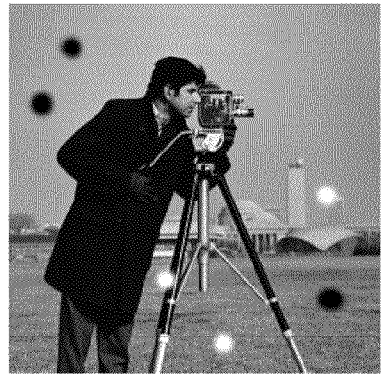
FIG. 4C presents the cameraman image with six significant differences (large visible spots).

A qualitative example that demonstrates the differences between the standard SSIM (prior art), CWSSIM (prior art), SSIM̃ and SPSSIM is shown in FIG. 4A through FIG. 4C.

FIG. 4A presents a cameraman image with a sub-pixel misregistration (0.5 pixel to the right) with respect to a reference image.

FIG. 4B presents the cameraman image with three small significant differences (small visible spots).

FIG. 4C presents the cameraman image with six significant differences (large visible spots). The similarity scores between the original cameraman image and each of the modifications in FIGS. 4A-4C using the standard SSIM, SSIM̃ (denoted "new SSIM"), CWSSIM and SPSSIM are displayed next on each image.

It is evident that for these examples, only with SPSSIM the similarity grade of truly different image pairs (where the difference consists of local defects in the image) is lower than the similarity between two images that are identical up to sub-pixel misregistration. It is also evident that in all the similarity metrics besides SPSSIM the similarity between the reference image and a similar image with sub-pixel misregistration (FIG. 4A) is lower than the similarity between the original image and a problematic image (FIGS. 4B and 4C).

Figure 4D:
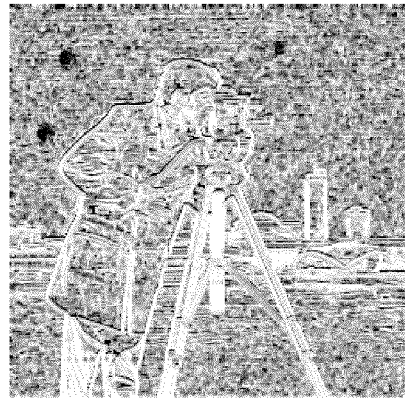
FIG. 4D presents present a similarity map of the comparison between the images in FIGS. 4A and 4B, using SSIM as the similarity measure.

FIG. 4D presents present a similarity map of the comparison between the images in FIGS. 4A and 4B, using SSIM̃ as the similarity measure. The brighter the area the more similarity exists in that area, and vice versa—the darker the area the less similarity exists in that area.

Figure 4E:
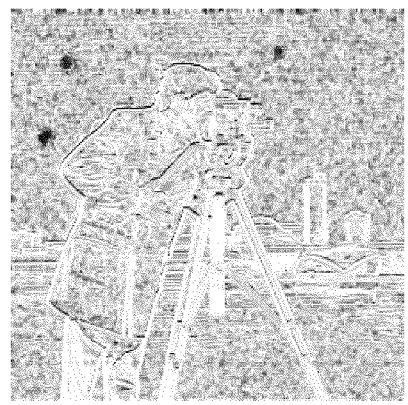
FIG. 4E presents present a similarity map of the comparison between the images in FIGS. 4A and 4B, using a similarity measure according to embodiments of the present invention.

FIG. 4E presents present a similarity map of the comparison between the images in FIGS. 4A and 4B, using SSIM̃ as the similarity measure, according to embodiments of the present invention.

Figure 4F:
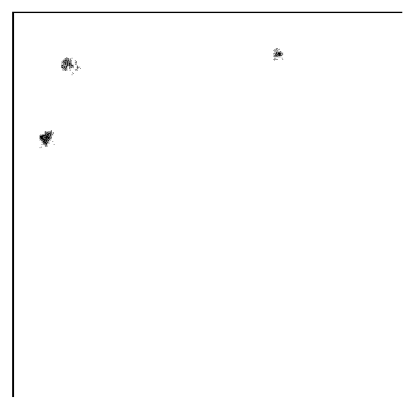
FIG. 4F presents present a similarity map of the comparison between the images in FIGS. 4A and 4B, using a similarity measure unaffected by sub-pixel registration, as the similarity measure, according to embodiments of the present invention.

FIG. 4F presents present a similarity map of the comparison between the images in FIGS. 4A and 4B, using SPSSIM as the similarity measure, according to embodiments of the present invention.

Note that SSIM̃ appears to be a measure for detecting differences attributed to defects than SSIM, because defects are better distinguished from noise that a difference which is the result of misregistration. Note also that with SPSSIM only real visible defects stand out.

Determination of similarity of two images, according to embodiments of the present invention, may be implemented in the form of software, hardware or a combination thereof.

Aspects of the present invention, as may be appreciated by a person skilled in the art, may be embodied in the form of a system, a method or a computer program product. Similarly, aspects of the present invention may be embodied as hardware, software or a combination of both. Aspects of the present invention may be embodied as a computer program product saved on one or more computer readable medium (or mediums) in the form of computer readable program code embodied thereon.

For example, the computer readable medium may be a computer readable signal medium or a computer readable storage medium. A computer readable storage medium may be, for example, an electronic, optical, magnetic, electromagnetic, infrared, or semiconductor system, apparatus, or device, or any combination thereof.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code in embodiments of the present invention may be written in any suitable programming language. The program code may execute on a single computer, or one a plurality of computers.

Aspects of the present invention are described hereinabove with reference to flowcharts and/or block diagrams depicting methods, systems and computer program products according to embodiments of the invention.

What is claimed is:

1. A computer implemented method comprising:
obtaining, by a processor, a first and second images for comparison;
globally registering, by a processor, the first and second images;
calculating, by a processor, for pairs of a first patch x of the first image and second patch y of the second image a similarity measure SM(x,y) wherein the similarity measure SM satisfies for any $$a \in [0,1], SM(x,y) \leq SM(x, ax+(1-a)y);$$

determining similarity measures for each of the pairs of patches; and
determining a similarity of the first and second images based on the calculated similarity measures for each of the pairs of patches.

2. A method as claimed in claim 1, wherein calculating of the similarity measure includes using the equation $$SSI\tilde{M}(x, y) = [l(x, y)]^\alpha \cdot [c(x, y)]^\beta \cdot \left[\frac{1}{2}(s(x, y) + 1)\right]^\gamma,$$

where x and y are the two images, SSIM̃(x, y) is the similarity measure, l(x,y) is the luminance component, c(x,y) is the contrast component, s(x,y) is a structure component and $$\frac{1}{2}(s(x, y) + 1)$$

is the normalized structure component, and where α, β and γ are parameters used to adjust the relative importance of the three components, α>0, β>0, γ>0.

3. A method as claimed in claim 1, comprising ignoring sub-pixel misregistration in the registration of the two images.

4. A method as claimed in claim 3, further including calculating, for pairs of corresponding patches of the two images, a further similarity measure $SM_{sp}$ ignoring sub-pixel misregistration given by $$SM_{sp}(x, y) = \min\left(1, \frac{SM(x, y)}{G_{SM}(x)}\right)$$

where x and y are the two patches images, SM(x,y) is the calculated similarity measure and where $$G_{SM}(x) = \min_{\tilde{x} \in N_x} [\delta \cdot SM(x, \tilde{x}) + \varepsilon],$$

$N_x$ being a set of n patches in the n-pixel neighborhood of a pixel in patch x, and where δ and ∈ are constants.

5. A method as claimed in claim 1, wherein obtaining of the images includes capturing at least one of the images by an image capturing device.

6. A method as claimed in claim 5, wherein said captured at least one of the images is a printed image.

7. A method as claimed in claim 1, comprising producing a similarity map.

8. A computer program product stored on a non-transitory tangible computer readable storage medium, the computer program including code for:
obtaining a first and second images for comparison;
globally registering the first and second images;
calculating for pairs of a first patch x of the first image and second patch y of the second image a similarity measure SM(x,y) wherein the similarity measure SM satisfies for any $$a \in [0,1], SM(x,y) \leq SM(x, ax+(1-a)y);$$

determining similarity measures for each of the pairs of patches; and
determining a similarity of the first and second images based on the calculated similarity measures for each of the pairs of patches.

9. A computer program product as claimed in claim 8, including code for calculating of the similarity measure includes using the equation $$SSI\tilde{M}(x, y) = [l(x, y)]^\alpha \cdot [c(x, y)]^\beta \cdot \left[\frac{1}{2}(s(x, y) + 1)\right]^\gamma,$$

where x and y are the two images, SSIM̃(x, y) is the similarity measure, l(x,y) is the luminance component, c(x,y) is the contrast component, s(x,y) is a structure component and $$\frac{1}{2}(s(x, y) + 1)$$

is the normalized structure component, and where α, β and γ are parameters used to adjust the relative importance of the three components, α>0, β>0, γ>0.

10. A computer program product as claimed in claim 8, including code for ignoring sub-pixel misregistration in the registration of the two images.

11. A computer program product as claimed in claim 10, including code for calculating, for pairs of corresponding patches of the two images, a further similarity measure $SM_{sp}$ ignoring sub-pixel misregistration given by $$SM_{sp}(x, y) = \min\left(1, \frac{SM(x, y)}{G_{SM}(x)}\right)$$

where x and y are the two patches images, SM(x,y) is the calculated similarity measure and where $$G_{SM}(x) = \min_{\tilde{x} \in N_x} [\delta \cdot SM(x, \tilde{x}) + \varepsilon],$$

$N_x$ being a set of n patches in the n-pixel neighborhood of a pixel in patch x, and where δ and ∈ are constants.

12. A computer program product as claimed in claim 8, including code for capturing at least one of the images by an image capturing device.

13. A computer program product as claimed in claim 12, including code for printing at least one of the images and wherein said captured at least one of the images is said printed at least one of the images.

14. A computer program product as claimed in claim 8, comprising producing a similarity map.

15. A data processing system comprising:
a processing unit in communication with a computer usable medium, wherein the computer usable medium contains a set of instructions wherein the processing unit is designed to carry out the set of instructions to:
obtain a first and second images for comparison;
globally register the first and second images;
calculate for pairs of a first patch x of the first image and second patch y of the second image a similarity measure SM(x,y) wherein the similarity measure SM satisfies for any $a \in [0,1], SM(x,y) \leq SM(x, ax+(1-a)y);$ determining similarity measures for each of the pairs of patches; and
determining a similarity of the first and second images based on the calculated similarity measures for each of the pairs of patches.

16. A system as claimed in claim 15, wherein the processing unit is designed to carry out the set of instructions to calculate the similarity measure using the equation $$S\tilde{SIM}(x, y) = [l(x, y)]^\alpha \cdot [c(x, y)]^\beta \cdot \left[\frac{1}{2}(s(x, y) + 1)\right]^\gamma,$$

where x and y are the two images, $S\tilde{SIM}(x, y)$ is the similarity measure, l(x,y) is the luminance component, c(x,y) is the contrast component, s(x,y) is a structure component and $$\frac{1}{2}(s(x, y) + 1)$$

is the normalized structure component, and where $\alpha$, $\beta$ and $\gamma$ are parameters used to adjust the relative importance of the three components, $\alpha > 0$, $\beta > 0$, $\gamma > 0$.

17. A system as claimed in claim 15, wherein the processing unit is designed to carry out the set of instructions to ignore sub-pixel misregistration in the registration of the two images.

18. A system as claimed in claim 17, wherein the processing unit is designed to carry out the set of instructions to calculate, for pairs of corresponding patches of the two images, a further similarity measure $SM_{sp}$ ignoring sub-pixel misregistration given by $$SM_{sp}(x, y) = \min\left(1, \frac{SM(x, y)}{G_{SM}(x)}\right)$$

where x and y are the two patches images, SM(x,y) is the calculated similarity measure and where $$G_{SM}(x) = \min_{\tilde{x} \in N_x} [\delta \cdot SM(x, \tilde{x}) + \varepsilon],$$

$N_x$ being a set of n patches in the n-pixel neighborhood of a pixel in patch x, and where $\delta$ and $\in$ are constants.

19. A system as claimed in claim 15, wherein the processing unit is designed to carry out the set of instructions to capture at least one of the images by an image capturing device.

20. A system as claimed in claim 15, wherein the processing unit is designed to carry out the set of instructions to print at least one of the images and wherein said captured at least one of the images is said printed at least one of the images.

* * * * *